(12) United States Patent
Wu

(10) Patent No.: US 6,297,982 B1
(45) Date of Patent: *Oct. 2, 2001

(54) RECTIFYING DEVICE OUTPUTTING MULTIPLE POWER SIGNALS

(75) Inventor: Wen-Ching Wu, Taoyuan Hsien (TW)

(73) Assignee: Delta Electronics, Inc. (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,914

(22) Filed: May 28, 1999

(30) Foreign Application Priority Data

Jan. 29, 1999 (TW) .................................. 88201529

(51) Int. Cl.[7] ...................................................... H02M 1/00
(52) U.S. Cl. ............................................................ 363/146
(58) Field of Search .................................. 363/146, 144, 363/145

(56) References Cited

U.S. PATENT DOCUMENTS

| | | | |
|---|---|---|---|
| 4,000,405 | * 12/1976 | Horwinski | 439/652 |
| 5,159,535 | * 10/1992 | Lee | 363/146 |
| 5,159,545 | * 10/1992 | Lee | 363/146 |
| 5,563,782 | * 10/1996 | Chen et al. | 363/146 |
| 5,900,684 | * 5/1999 | Lam | 363/146 |
| 5,973,948 | * 10/1999 | Hahn et al. | 363/146 |
| 6,091,611 | * 7/2000 | Lanni | 363/144 |

* cited by examiner

*Primary Examiner*—Peter S. Wong
*Assistant Examiner*—Gary L. Laxton

(57) ABSTRACT

A rectifying device receiving a first power signal from a power source and outputting multiple power signals includes a rectifying device body receiving and rectifying a first power signal for generating a third power signal and an outlet mounted on the rectifying device body and electrically connected with the power source for supplying a second power signal. The rectifying device further includes an inlet having a plurality of conducting pieces electrically connected with the power source. The rectifying device body includes a first housing, a second housing, a circuit board positioned between the first housing and the second housing, and a connector mounted on the circuit board and electrically connected between the outlet and the inlet for transmitting the first power signal therethrough.

18 Claims, 3 Drawing Sheets

RECTIFYING DEVICE OUTPUTTING MULTIPLE POWER SIGNALS

FIELD OF THE INVENTION

The present invention relates to a rectifying device, and more particularly to a rectifying device outputting multiple power signals.

BACKGROUND OF THE INVENTION

Owing to the electrification and the popularization of computer, there are usually a lot of electronic devices used in a house now. A problem of the power supply is then encountered. The consumed power of several electronic devices, such as speakers and modem, is not so much but each of these devices needs a specific voltage. Therefore, a rectifying device is necessary for this kind of electronic device. The volume of a conventional rectifying device is relatively big. However, the number of sockets in a house is commonly limited. Usually, two or three sockets are arranged together. That is, a rectifying device only provides one voltage but occupies two to three sockets in a time. When an electronic device is used, some sockets may be covered by the rectifying device and can not be used. When several electronic devices are used at the same time, the number of the sockets may not be enough. So, it is tried by the applicant to deal with the problem encountered in the prior art.

SUMMARY OF THE INVENTION

Therefore, an object of the present invention is to provide a rectifying device outputting a plurality of power signals.

According to the present invention, the rectifying device includes a rectifying device body receiving and rectifying a first power signal from a power source for generating a third power signal and an outlet mounted on the rectifying device body and electrically connected with the power source for supplying a second power signal. The rectifying device further includes an inlet having a plurality of conducting pieces electrically connected with the power source. These conducting pieces are made of copper. The first power signal is connected with the second power signal in parallel.

Certainly, the rectifying device body includes a first housing, a second housing, and a circuit board positioned between the first housing and the second housing. The rectifying device body further includes a connector mounted on the circuit board and electrically connected between the outlet and the inlet for transmitting the first power signal therethrough. The circuit board has a power converter for generating and supplying the third power signal.

Certainly, the first housing of the rectifying device has an opening for mounting the outlet thereon. The second housing has a plurality of holes for enabling the conducting pieces to protrude from the second housing. Besides, the second housing has a plurality of holders disposed at the inner periphery thereof for holding the circuit board.

Certainly, the circuit board includes a plurality of grooves for engaging with the connector and a plurality of holes for enabling the conducting pieces to protrude from the circuit board and electrically connected with the connector. In addition, the power converter of the circuit board has a rectifying circuit and a voltage-stabilizing circuit for rectifying the first power signal steadily.

Certainly, the connector of the rectifying device includes a plurality of tongues correspondingly aligned with a plurality of grooves formed on the circuit board for securing the connector to the circuit board. The connector further includes a first connecting element electrically connected to the outlet and a second connecting element electrically connected to the inlet.

Certainly, the outlet of the rectifying device includes an output end supplying the second power signal, an input end electrically connected to the connector, and a fixing unit having a plurality of elastic pieces for securing the outlet to the first housing. The elastic pieces bias against and thus attach to the first housing when the outlet is inserted into an opening of the first housing. The output end of the outlet includes a plurality of plug holes. The input end of the outlet includes a plurality of plug pins.

Certainly, the parameters of the second power signal are the same as those of the first power signal. The parameters of the third power signal are different from those of the first power signal. The first power signal is an alternative current (AC) signal.

The present invention may best be understood through the following description with reference to the accompanying drawings, in which:

DETAILED DESCRIPTION OF THE PREFERRED EMBODIMENTS

Figure 1:
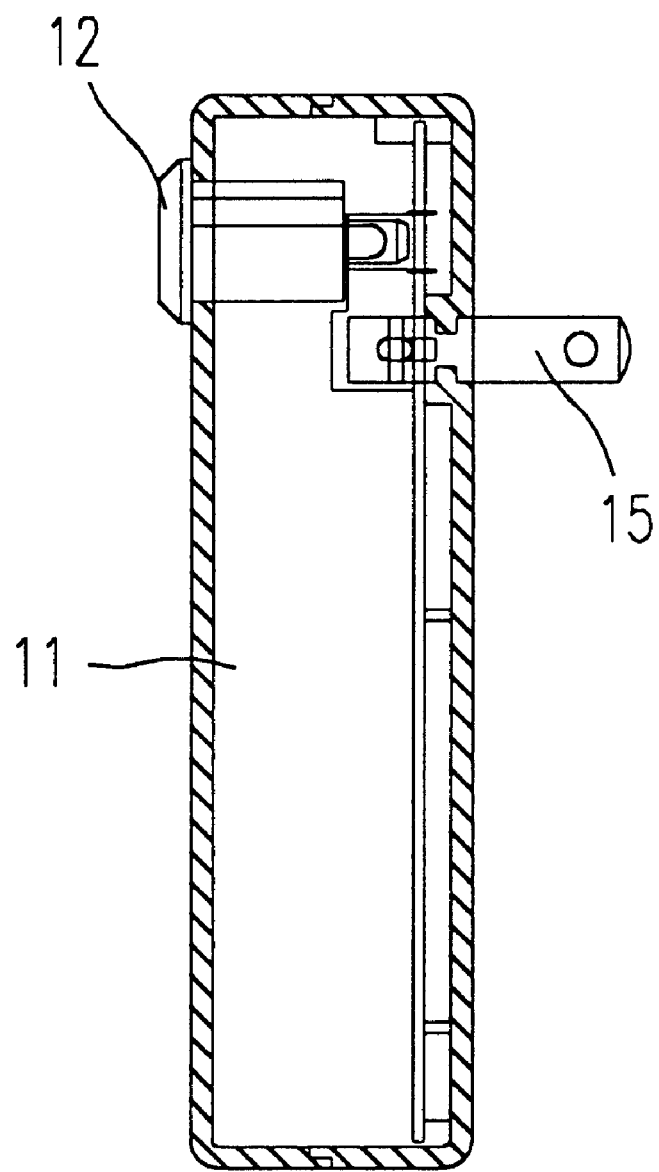
FIG. 1 is a sectional view showing a preferred embodiment of a rectifying device according to the present invention.

Please refer to FIG. 1 which is a sectional view showing a rectifying device according to the present invention. The rectifying device includes a rectifying device body 11, an outlet 12, and an inlet having a pair of conducting pieces 15. The outlet 12 is positioned on one surface of the rectifying device body 11 and the conducting pieces 15 are positioned on the opposite surface. From the side view of the rectifying device, the outlet 12 is arranged above the conducting pieces 15. The conducting pieces 15 are the plug pins of the rectifying device.

Figure 2:
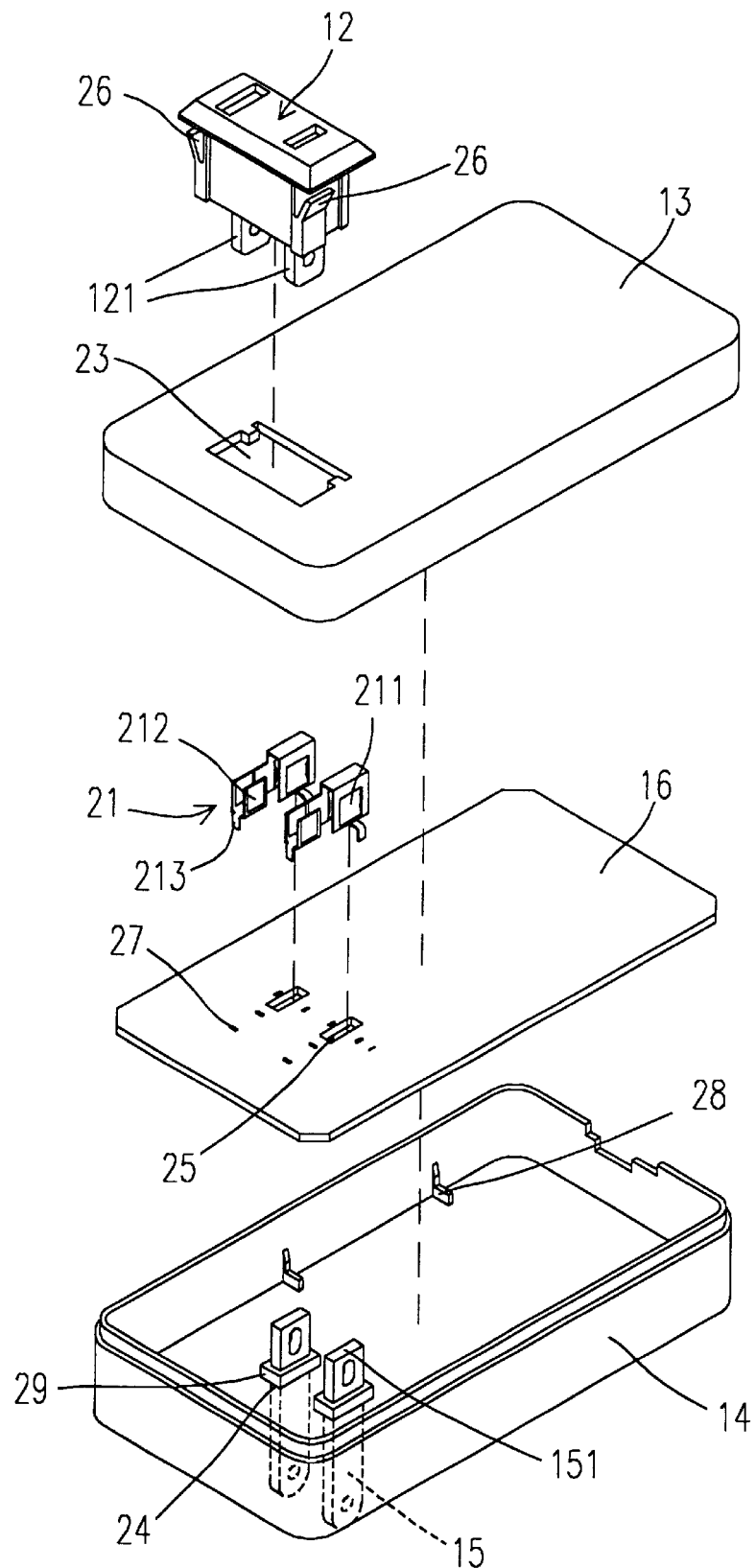
FIG. 2 is a schematic diagram showing the assembly of the preferred embodiment of a rectifying device according to the present invention.

Referring to FIG. 2 which is a diagram showing how to assemble the rectifying device. The rectifying device body 11 includes a first housing, a second housing, a circuit board 16, and a connector 21. The first housing is the front cover 13 and the second housing is the back cover 14 of the rectifying device body. The circuit board 16 is positioned between the front cover 13 and the back cover 14. The connector is mounted on the circuit board 16.

The circuit board 16 has a plurality of grooves 27 for engaging with the connector 21 and two holes 25 for enabling the conducting pieces 15 to protrude from the circuit board 16. The conducting pieces 15 pass through the holes 25 and are respectively connected with the second connecting elements 212 of the connector 21. The tongues 213 of the connector 21 are correspondingly aligned with these grooves 27 on the circuit board 16 to secure the connector 21 to the circuit board 16.

Figure 3:
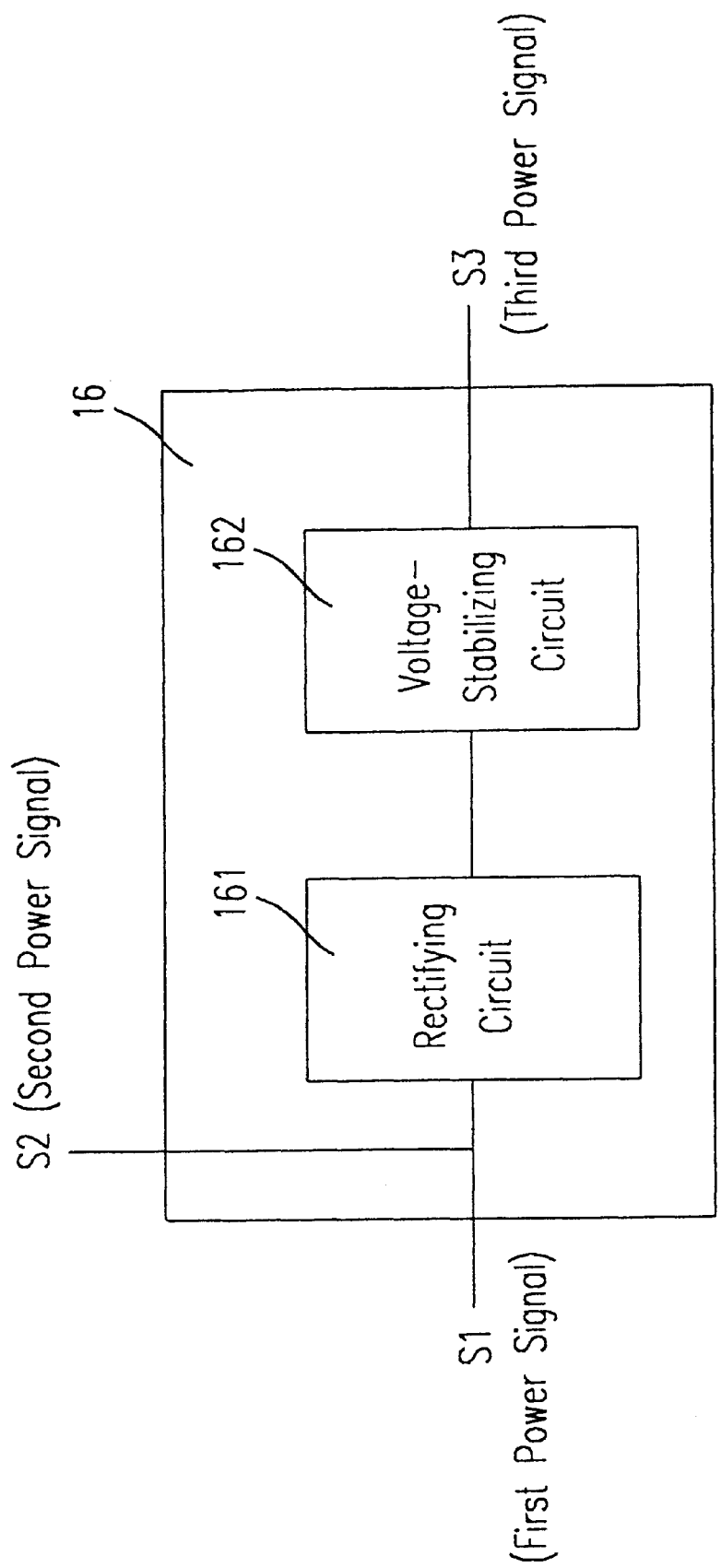
FIG. 3 is a schematic diagram showing the circuits of the rectifying device according to the prsent invention.

The circuit board 16 also includes a power converter for generating and supplying the third power signal S3. Referring to FIG. 3, the power converter includes a rectifying circuit and a voltage-stabilizing circuit for rectifying and converting the first power signal S1 steadily.

The front cover 13 has a hole 23 for mounting the outlet 12 thereon. The outlet 12 includes two elastic pieces 26 for securing the outlet to the front cover 13 and two plug pins 121 connected with the first connecting elements 211 of the connector 21. The elastic pieces 26 may bias against and thus attach to the front cover 13 when the outlet 12 is inserted into the hole 23 on the front cover 13. Thus, the outlet 12 and the inlet having two conducting pieces 15 are linked together by the connector 21. Because the conducting pieces 15 and the connector 21 are both made of copper, the first power signal can be transmitted to the outlet 12 through the conducting pieces 15 for supplying the second power signal S2. Therefore, the first power signal is connected with the second power signal in parallel. Further, a fourth or fifth power signal can be also connected with the first power signal in parallel.

The back cover 14 has two holes 24 for enabling the conducting pieces 15 to protrude from the back cover 14. Two annular pieces 29 are arranged around the holes 24. In addition, a plurality of holders 28 are formed at the inner periphery of the back cover 14. Therefore, the circuit board 16 is positioned on the holders 28 and the annular pieces 29 of the back cover 14.

Accordingly, the rectifying device of the present invention can receive and rectify the first power signal to output a rectifying signal (i.e. the third power signal), and also supply a second power signal. Although the rectifying device may occupy two or three sockets in a time, an extra power signal (i.e. second power signal) can be provided from the outlet on the rectifying device. Further, a rectifying device can provide more power signals if more outlets are arranged on the rectifying device. Usually, the first power signal is an alternative current (AC) signal provided by a socket of a house. The second power signal is also an alternative current signal and connected with the first power signal in parallel. The third power signal is a direct current (DC) signal outputted from the rectifying device.

The voltage of the rectifying signal is relatively low; therefore, the socket can be optimized when the second and third power are provided by the same first power. Besides, the assembling process of the rectifying device is relatively simply. There is no welding step in the assembling process. The parts of the rectifying device, including the outlet, the circuit board, and the inlet, can be linked together by only one connector. The manufacturing cost of the rectifying device can be reduced.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical adapter comprising:
    an electrical adapter body having a first housing and a second housing;
    a circuit board disposed in said electrical adapter body and having a plurality of holes therethrough;
    an inlet electrically connected to said circuit board at one end and having a plurality of conducting pieces at the other end therof;
    an outlet mounted on said electrical adapter body; and
    a connector, through said plurality of holes, directly electrically connected to all of said printed circuit board, said outlet and said inlet.

2. The electrical adapter according to claim 1, wherein said conducting pieces are made of copper.

3. The electrical adapter according to claim 1, wherein said first housing has an opening for mounting said outlet thereon.

4. The electrical adapter according to claim 1, wherein said second housing further includes a plurality of holders disposed at the inner periphery for holding said circuit board.

5. The electrical adapter according to claim 1, wherein said circuit board comprises a plurality of grooves for engaging with said connector.

6. The electrical adapter according to claim 5, wherein said connector comprises a plurality of tongues correspondingly aligned with said plurality of grooves formed on said circuit board for securing said connector to said circuit board.

7. The electrical adapter according to claim 1, wherein said circuit further comprises a power converter having a rectifying circuit and a voltage-stabilizing circuit for rectifying a first power signal steadily.

8. The electrical adapter according to claim 1, wherein said connector further comprises a first connecting element electrically connected to said outlet and a second connecting element connected to said inlet.

9. The electrical adapter according to claim 1, wherein said inlet is used for being electrically connected to a power signal.

10. The electrical adapter according to claim 9, wherein said outlet is used for providing a direct current signal when said selective power signal is converted into said direct current signal.

11. The electrical adapter according to claim 9, wherein said power signal is an alternating current (AC) signal.

12. The electrical adapter according to claim 1, wherein said holes are used for enabling said plurality of conducting pieces of said inlet to protrude from said circuit board and to be electrically connected with said connector.

13. The electrical adapter according to claim 1, wherein said outlet comprises an output end formed on a top surface of said outlet for shielding said outlet, an input end having a plurality of plug pins for being electrically connected to said connector and a fixing unit having a plurality of elastic pieces for securing said outlet to said first housing.

14. The electrical adapter according to claim 13, wherein said elastic pieces bias against and thus attach to said first housing when said outlet is inserted into an opening of said first housing.

15. The electrical adapter according to claim 13, wherein said output end of said outlet includes a plurality of plug holes.

16. The electrical adapter according to claim 13, wherein said input end of said outlet includes a plurality of plug pins.

17. An electrical adapter comprising:
    an electrical adapter body having a first housing and a second housing;
    a circuit board disposed in said electrical adapter body and having a plurality of holes therethrough;
    an inlet electrically connected to said circuit board;
    an outlet mounted on said electrical adapter body and having a plurality of plug pins at one end thereof to be protruded into said first housing; and
    a connector, through said plurality of holes, directly electrically connected to said circuit board, said outlet and said inlet.

18. An electrical adapter comprising:
  an electrical adapter body having a first housing and a second housing;
  a circuit board disposed in said electrical adapter body;
  an inlet electrically connected to said circuit board at one end and having a plurality of conducting pieces at the other end thereof;
  an outlet mounted on said electrical adapter body and having a plurality of plug pins at one end thereof to be protruded into said first housing; and
  a connector disposed on said circuit board, directly electrically connected to said circuit board so as to directly electrically connect said outlet and said inlet.

* * * * *